(12) United States Patent
Liu et al.

(10) Patent No.: US 7,930,303 B2
(45) Date of Patent: Apr. 19, 2011

(54) CALCULATING GLOBAL IMPORTANCE OF DOCUMENTS BASED ON GLOBAL HITTING TIMES

(75) Inventors: Tie-Yan Liu, Beijing (CN); Hang Li, Beijing (CN); Lei Qi, Shandong Province (CN); Bin Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/742,276

(22) Filed: Apr. 30, 2007

(65) Prior Publication Data

US 2008/0270377 A1    Oct. 30, 2008

(51) Int. Cl.
   G06F 7/00    (2006.01)
   G06F 17/30    (2006.01)
(52) U.S. Cl. ............. 707/748; 707/749; 707/751
(58) Field of Classification Search .......... 707/748, 707/749, 751
   See application file for complete search history.

(56) References Cited

U.S. PATENT DOCUMENTS

| | | | |
|---|---|---|---|
| 5,878,223 A * | 3/1999 | Becker et al. ............. 709/223 |
| 6,115,718 A * | 9/2000 | Huberman et al. .......... 707/102 |
| 6,996,572 B1 * | 2/2006 | Chakrabarti et al. ........ 707/102 |
| 2002/0038299 A1 * | 3/2002 | Zernik et al. ............... 707/3 |
| 2005/0015626 A1 | 1/2005 | Chasin |
| 2005/0060297 A1 | 3/2005 | Najork |
| 2005/0246322 A1 | 11/2005 | Ravikumar et al. |
| 2006/0004748 A1 | 1/2006 | Ramarathnam et al. |
| 2006/0036598 A1 | 2/2006 | Wu |
| 2006/0069667 A1 | 3/2006 | Manasse et al. |
| 2006/0095416 A1 | 5/2006 | Barkhin et al. |
| 2006/0184500 A1 | 8/2006 | Najork et al. |
| 2006/0248072 A1 | 11/2006 | Brewer et al. |
| 2007/0038600 A1 | 2/2007 | Guha |

FOREIGN PATENT DOCUMENTS

WO    WO 2007/016868 A2    2/2007

OTHER PUBLICATIONS

Aldous et al. "Chapter 3, Reversible Markov Chains", Monograph, Sep. 2, 1994. (53 pages).
Aldous, et al. "Chapter 2, General Markov Chains", Sep. 10, 1999 (36 pages).
Baeza-Yates, et al. "Web Structure, Dynamics and Page Quality", *SPIRE*, Lisbon, Portugal, pp. 117-130, 2002.
Benczur, et al. "SpamRank—Fully Automatic Link Spam Detection Work in Progress", 2002 (14 pages).

(Continued)

*Primary Examiner* — John R. Cottingham
*Assistant Examiner* — Mariela Reyes
(74) *Attorney, Agent, or Firm* — Perkins Coie LLP

(57) ABSTRACT

A calculate importance system calculates the global importance of a web page based on a "mean hitting time." Hitting time of a target web page is a measure of the minimum number of transitions needed to land on the target web page. Mean hitting time of a target web page is an average number of such transitions for all possible starting web pages. The calculate importance system calculates a global importance score for a web page based on the reciprocal of a mean hitting time. A search engine may rank web pages of a search result based on a combination of relevance of the web pages to the search request and global importance of the web pages based on a global hitting time.

15 Claims, 6 Drawing Sheets

OTHER PUBLICATIONS

Brin, et al. "The Anatomy of a Large-Scale Hypertextual Web Search Engine", *In Proceedings of the Seventh International World Wide Web Conference*, Australia, 1998.

Gyongyi, et al. "Combating Web Spam with TrustRank", *Proceedings of the 30th VLDB Conference*, Toronto, Canada 2004 (12 pages).

Gyongyi, et al. "Link Spam Alliances", *Technical Report*, Stanford University, 2005.

Gyongyi, et al. "Web Spam Taxonomy", In the *First International Workshop on Adversarial Information Retrieval on the Web*, 2005.

Langville, et al. "Deeper Inside PageRank", *Internet Mathematics*, 1(3): 335-380, 2004.

Liang, et al. "R-SpamRank: A Spam Detection Algorithm Based on Link Analysis", *Journal of Computational Information Systems*, 2007. (6 pages).

Page, et al. "The PageRank Citation Ranking: Bringing Order to the Web", *Technical Report*, Stanford University, Stanford, CA, 1998.

Richardson, et al. "Beyond PageRank: Machine Learning for Static Ranking", *Proceedings of the Fifteenth International World Wide Web Conference*, pp. 707-715, 2006.

Richardson, et al. "The Intelligent Surfer: Probabilistic Combination of Link and Content Information in PageRank", *Advances in Neural Information Processing Systems*, 14, pp. 1441-1448, 2002.

Wu, et al. "Identifying Link Farm Spam Pages", *Proceedings of the 14th International WWW Conference*, Copyright 2005, International World Wide Web Conference Committee, May 10-14, 2005 (10 pages).

\* cited by examiner

CALCULATING GLOBAL IMPORTANCE OF DOCUMENTS BASED ON GLOBAL HITTING TIMES

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

One well-known technique for page ranking is PageRank, which is based on the principle that web pages will have links to (i.e., "out links") important web pages. The importance of a web page is based on the number and importance of other web pages that link to that web page (i.e., "in links"). PageRank is based on a random surfer model of visiting web pages of a web graph (vertices representing web pages and links representing hyperlinks) and represents the importance of a web page as the stationary probability of visiting that web page. In the random surfer model, a surfer visiting a current page will visit a next page by randomly selecting a link of the current web page. If the current web page has three out links to target web pages, then the probability of visiting each target web page from the current web page is ⅓. PageRank is thus based on a Markov random walk that only depends on the information (e.g., hyperlink) of the current web page.

A web graph may be represented as G=<V,E>, where V={1, 2, ..., n} is the set of vertices and E={<i,j>|i,j ∈ V} is the set of edges. The links between web pages can be represented by an adjacency matrix A, where $A_{ij}$ is set to one when there is an out link from a source web page i to a target web page j. The importance score $w_j$ for web page j can be represented by the following:

$$w_j = \sum_i A_{ij} w_i \quad (1)$$

This equation can be solved by iterative calculations based on the following:

$$A^T w = w \quad (2)$$

where w is the vector of importance scores for the web pages and is the principal eigenvector of $A^T$.

PageRank may also factor in that a surfer may randomly select a web page to visit next that is not linked to by the current web page. Thus, the surfer may next visit a target web page of the current web page with a probability of a and next visit a randomly selected web page with a probability of 1−α. To factor in this random selection of web pages, PageRank generates an initial transition matrix P by normalizing each non-zero row of the adjacency matrix with the sum of its elements. PageRank then sets each element of a zero row in matrix P to 1/n to generate transition probability matrix $\bar{P}$. The model of representing the random selection of links of target web pages and the random selection of web pages can be represented by the following:

$$\bar{\bar{P}} = \alpha \bar{P} + (1-\alpha) U \quad (3)$$

where $\bar{\bar{P}}$ is the combined transition probability matrix and U is a uniform probability distribution matrix in which each element is set to 1/n. PageRank considers the stationary distribution $\pi = (\pi_1, \pi_2, \ldots, \pi_n)^T$ of the transition probability matrix $\bar{\bar{P}}$ to represent the importance of each web page. PageRank may compute the stationary distribution through an iterative process as represented by the following:

$$\pi(t+1) = (\bar{\bar{P}})^T \pi(t) \quad (4)$$

where $\pi(0) = (1, 1, \ldots, 1)_n^T$, t represents the iteration count, and the iterative process continues until π converges on a solution.

Although PageRank can be very useful, in part because it is a query-independent measure of importance, it is especially susceptible to "link spamming." "Spamming" in general refers to a deliberate action taken to unjustifiably increase the rank, relevance, popularity, importance, and so on of a web page or a web site. In the case of link spamming, a spammer can manipulate links to unjustifiably increase the importance of a web page. For example, a spammer may provide a web page of useful information with hidden links to spam web pages. When many web pages point to the useful information, the importance of the spam web pages is indirectly increased. As another example, many web sites, such as blogs and web directories, allow visitors to post links. Spammers can post links to their spam web pages to directly or indirectly increase the importance of the spam web pages. As another example, a group of spammers may set up a link exchange mechanism in which their web sites point to each other to increase the importance of the web pages of the spammers' web sites.

Web spam presents problems for various techniques that rely on web data. For example, a search engine service that orders search results in part based on relevance, popularity, or importance of web pages may rank spam web pages unjustifiably high because of the spamming. As another example, a web crawler may spend valuable time crawling the links of spam web sites, which increases the overall cost of web crawling and may reduce its effectiveness.

PageRank is especially susceptible to link spamming because it is based on the concept of a "returning time" of a web page. Returning time of a web page is a measure of the number of transitions needed to return to the web page starting from the web page itself. The importance score of a web page is the reciprocal of the returning time. Thus, when a web page has a small returning time, it will have a large importance score. Returning time may represented by the following:

$$T_i^+ = \min\{t \geq 1 : X_t = i\} \quad (5)$$

where $T_i^+$ represents the returning time for web page i and $X_t$ represents a discrete-time Markov chain of the transition probability matrix for time t. The stationary transition probability, and thus importance, can be represented by the following:

$$\pi_i = 1/E_i T_i^+ \quad (6)$$

where $\pi_i$ represents the stationary probability for web page i and $E_i T_i$ represents the expected returning time. Since the Markov chain starts from a target page i itself, the behavior of the random walk is largely affected by the local structure around page i. Link spammers can create an arbitrary local structure around a web page to take advantage of this drawback of PageRank. A link spammer can set up a star-structured link farm in which a central web page contains links to many other boosting web pages and those boosting web pages contain links only to the central web page. In such a case, the random walk from the central web page is trapped in this star-like local structure, and the mean returning time can be significantly reduced, and therefore importance is increased. In the random walk model without a possibility of jumping to a random non-linked-to web page ($\alpha=1$), all possible series of random walk transitions will be between the central web page and one of its boosting web pages. The mean returning time is only 2. Even when the possibility of transitioning to a random web page is factored in ($\alpha<1$), such a link farm can significantly reduce the mean returning time and increase importance.

SUMMARY

A method and system for calculating global importance of documents based on a global hitting time is provided. A calculate importance system calculates the global importance of a web page based on a "mean hitting time." Hitting time of a target web page is a measure of the minimum number of transitions needed to land on the target web page. Mean hitting time of a target web page is an average number of such transitions for all possible starting web pages. A hitting time that is based on a hitting time with a starting page other than the target web page is considered to be a global hitting time. The calculate importance system calculates a global importance score for a web page based on the reciprocal of a global hitting time. The hitting times of the web pages of link spam are likely to be overwhelmed by the hitting times of the hundreds of millions of other web pages. A search engine may rank web pages of a search result based on a combination of relevance of the web pages to the search request and global importance of the web pages based on a global hitting time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
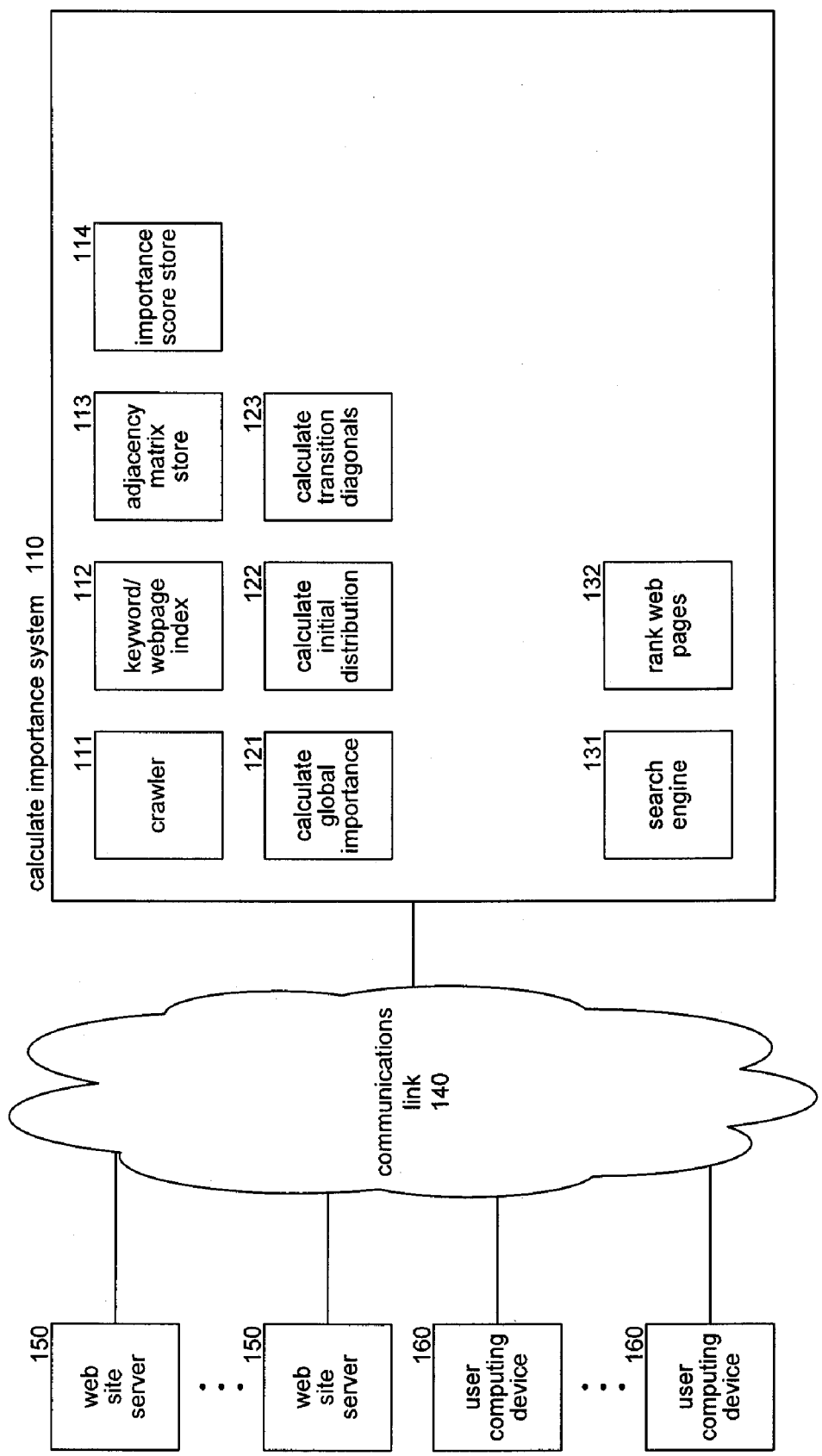
FIG. 1 is a block diagram that illustrates components of the calculate importance system in one embodiment.

A method and system for calculating global importance of documents based on a global hitting time is provided. In some embodiments, a calculate importance system calculates the global importance of a web page based on a "mean hitting time." Hitting time of a target web page is a measure of the minimum number of transitions needed to land on the target web page. The hitting time depends on the starting web page. For example, the hitting time from a starting web page that has a direct link to the target web page is 1, whereas the hitting time from a starting web page that is indirectly linked to the target web page via a sequence of four other web pages is 5. Mean hitting time of a target web page is an average number of such transitions for all possible starting web pages. Hitting time is different from returning time in that returning time is a special case of hitting time in which the starting web page and the target web page are the same web page. A hitting time that is based on a hitting time with a starting page other than the target web page is considered to be a global hitting time. Mean hitting time is one example of a global hitting time.

In one embodiment, the calculate importance system calculates a global importance score for a web page based on the reciprocal of a mean hitting time. Because the mean hitting time may be an average based on the hitting time of all (or at least very many) web pages, the contribution of link spam, such as a star-structured link farm, to the global importance of a web page is much less than for an importance based on returning time. The hitting times of the web pages of link spam are likely to be overwhelmed by the hitting times of the hundreds of millions of other web pages. A search engine may rank web pages of a search result based on a combination of relevance of the web pages to the search request and global importance of the web pages based on a global hitting time. In this way, the contribution of link spam to importance of a web page can be greatly reduced.

The calculate importance system may represent hitting time as follows:

$$T_i = \min\{t \geq 0 : X_1 = i\} \quad (7)$$

where $T_i$ represents the hitting time of web page i and $X_t$ represents a discrete-time Markov chain of the transition probability matrix for time t. The calculate importance system represents the global importance of a web page as the reciprocal of the mean hitting time starting from any distribution over the whole web graph as represented by the following:

$$GR_\mu(i) = 1/E_\mu T_i \quad (8)$$

where $\mu$ represents any chosen global distribution, that is, the probability of each web page being the starting web page. The mean hitting time is represented as follows:

$$E_\mu T_i = \sum_j \mu_j E_j T_i \quad (9)$$

where $\mu_j$ represents the probability that a random surfer chooses web page j as the starting web page and $E_j T_i$ represents the expected hitting time with starting web page j and target web page i. By taking the mean of the expected hitting time starting from all web pages, the local structure surrounding a target web page, including link spam, is greatly attenuated. Although link spammers could change the local structure of a target web page to decrease $E_jT_i$ with web pages around the target web page i, those surrounding web pages under the link spammers' control are only an extremely small portion of the overall web graph. The contributions of link spammers' efforts are attenuated by averaging over expected hitting times from starting web pages not under their control. Web pages that gain high importance based on low global hitting times are globally important web pages, such as the main web pages of major search engines, large companies, popular online communities, and so on. These web pages have a central role in the whole web graph and are accessible from most web pages within a few transitions.

In some embodiments, the calculate importance system may use different initial distributions μ depending on the objectives of calculating the importance. The calculate importance system may use any one or combination of the following distributions:

1) a stationary probability distribution,
2) a uniform distribution over all web pages,
3) a distribution over labeled non-spam pages or other known desirable web pages, and
4) a user-specific distribution (e.g., web pages of a user's favorite web sites).

In some embodiments, the importance calculation system calculates the global importance of web pages using a global hitting time and a stationary probability distribution as the initial distribution, referred to a stationary global importance. The calculate importance system calculates the importance by converting the expectation of a random variable to an expression using the diagonal of t-order transition matrix $P^t$. The calculate importance system calculates the importance using the fundamental matrix as represented by the following:

$$Z = (I - P + e\pi^t)^{-1} \quad (10)$$

where I is the identity matrix. (See Aldous, D. and Fill, J., "Reversible Markov Chains," Monograph, 1994.) The relationship between the mean hitting time given the initial stationary probability distribution and Z is represented by the following:

$$E_\pi T_i = Z_{ii}/\pi_i$$

$$E_j T_i = (Z_{ii} - Z_{ij})/\pi_i \quad (11)$$

where $Z_{ij}$ is represented by the following:

$$Z_{ij} = \delta_{ij} + \sum_{t=1}^{\infty} (P^t_{ij} - \pi_j) \quad (12)$$

where $\delta_{ij}$ is equal to 1 when i equals j and 0 otherwise. The calculate importance system can approximate $Z_{ij}$ using the first m terms of Equation 12. Thus, the approximation of $Z_{ij}$ can be represented by the following:

$$\hat{Z}_{ij} = \delta_{ij} + \sum_{t=1}^{m} (P^t_{ij} - \pi_j) \quad (13)$$

where $\hat{Z}_{ij}$ represents the approximation of $Z_{ij}$. The value of m may be, for example, 5.

FIG. 1 is a block diagram that illustrates components of the calculate importance system in one embodiment. The calculate importance system 110 is connected to web site servers 150 and user computing devices 160 via communications link 140. The calculate importance system may include a crawler component 111, a keyword/web page index 112, an adjacency matrix store 113, and an importance score store 114. The crawler component may crawl the web pages of the web sites and store a mapping of keywords to web pages that contain the keywords in the keyword/web page index. The crawler component may also store a representation of the adjacency matrix in the adjacency matrix store.

The calculate importance system may also include a calculate global importance component 121, a calculate initial distribution component 122, and a calculate transition diagonals component 123. The calculate global importance component calculates the global importance of each web page. The calculate global importance component invokes the calculate initial distribution component to calculate the initial distribution. The calculate global importance component then calculates global importance of the web page according to Equation 10. The calculate global importance component invokes the calculate transition diagonals component to generate the values for $Z_{ij}$ of Equation 11. The calculate global importance component stores the global importance of each web page as an importance score in the importance score store.

The calculate importance system may include a search engine 131 and a rank web pages component 132. The search engine receives search requests and uses the keyword/web page index to identify matching web pages as a search result. The search engine then invokes the rank web pages component to rank the web pages of the search result based on relevance to the search request and the global importance of the web pages as indicated by the importance score store.

The computing device on which the calculate importance system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the calculate importance system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used by various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The calculate importance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web and generate the adjacency matrix and the keyword/web page mapping. Also, the search engine may be hosted on a separate computing system.

Figure 2:
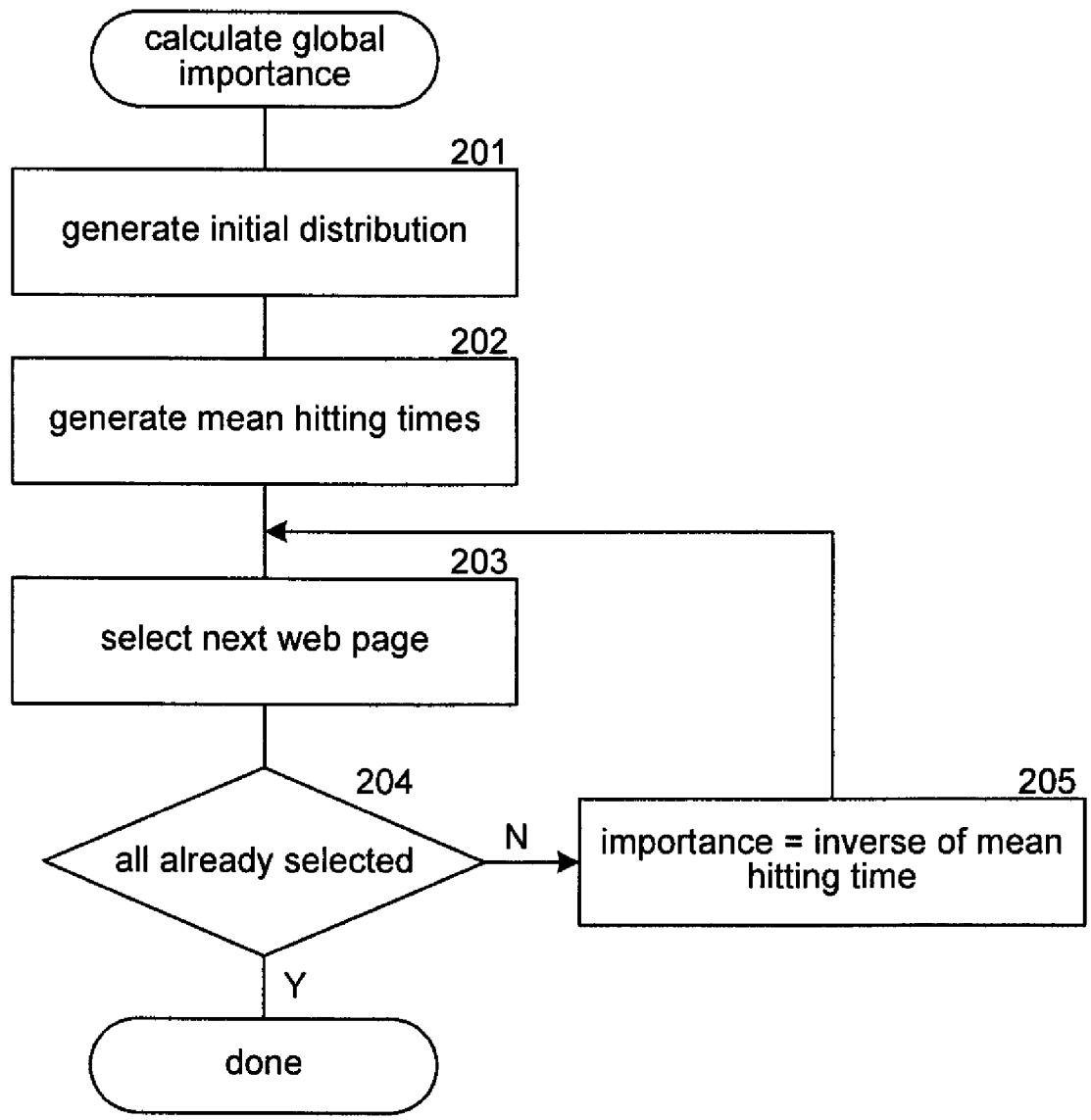
FIG. 2 is a flow diagram that illustrates the overall processing of the calculate global importance component of the calculate importance system in one embodiment.

FIG. 2 is a flow diagram that illustrates the overall processing of the calculate global importance component of the calculate importance system in one embodiment. In block 201, the component generates an initial distribution for the web pages whose importance is to be calculated. In block 202, the component generates the mean hitting times for each of the web pages based on the initial distribution. In blocks 203-205, the component loops setting the global importance for each web page. In block 203, the component selects the next web page. In decision block 204, if all the web pages have already been selected, then the component completes, else the component continues at block 205. In block 205, the component sets the importance of the selected web page based on the inverse of the mean hitting time for the web page and then continues at block 203.

Figure 3:
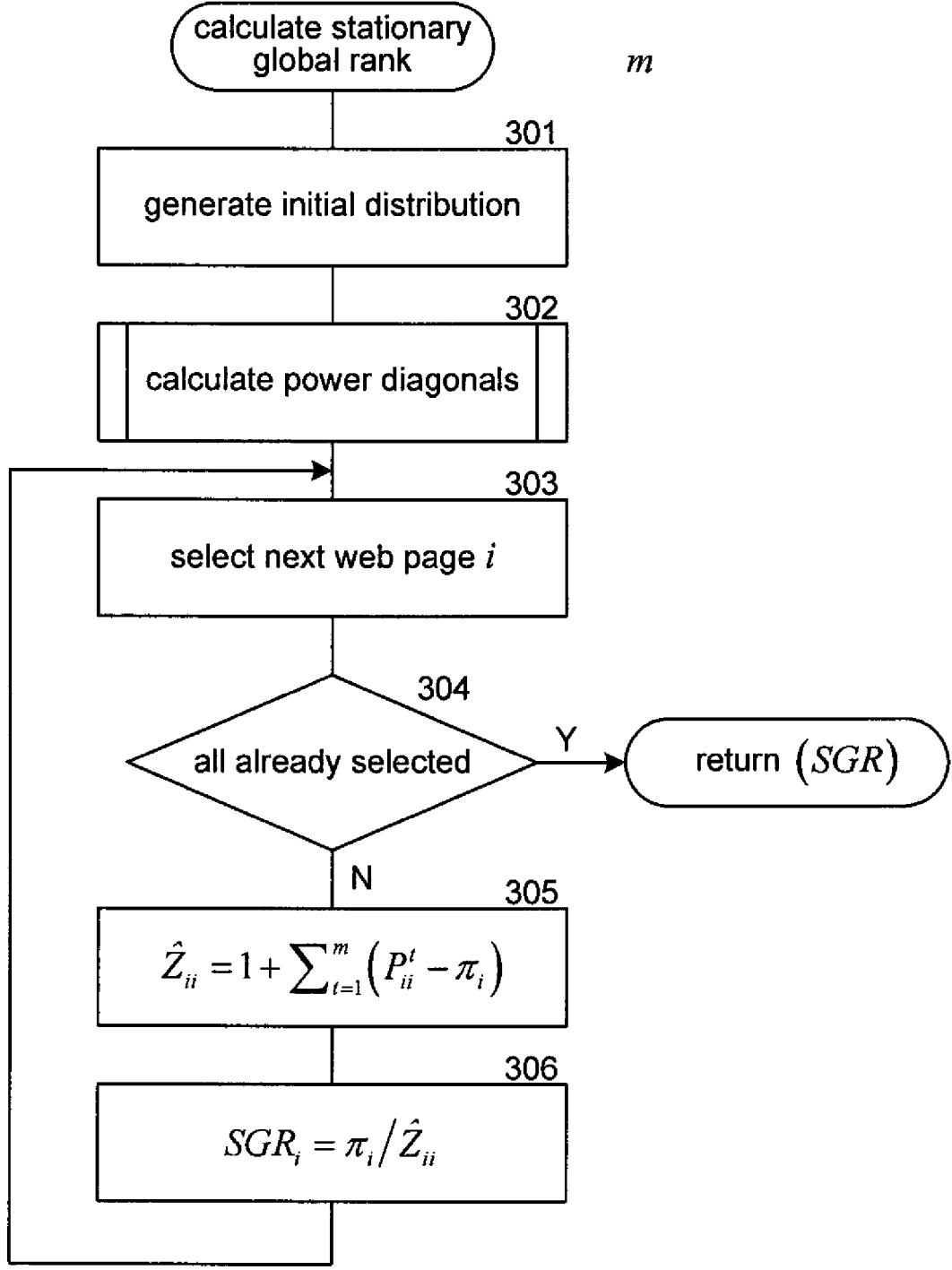
FIG. 3 is a flow diagram that illustrates detailed processing of the calculate global importance component of the calculate importance system in one embodiment.

FIG. 3 is a flow diagram that illustrates detailed processing of the calculate global importance component of the calculate importance system in one embodiment. The component is passed an indication of the number of transitions to use in the approximation. The component approximates the global importance based on Equations 11 and 13. In block 301, the component generates an initial probability distribution for the web pages. In some embodiments, the component uses the stationary probabilities derived from a probability transition matrix based on the adjacency matrix as represented by Equation 4. In block 302, the component invokes a calculate power diagonals component to calculate the diagonals $P_{ii}^{m}$ used in Equations 11 and 13. In blocks 303-306, the component loops approximating the global importance of each web page. In block 303, the component selects the next web page. In decision block 304, if all the web pages have already been selected, then the component returns the global importance scores, else the component continues at block 305. In block 305, the component calculates the value of Equation 13 for the selected web page using the diagonal value for the selected web page calculated in block 302. In block 306, the component sets the global importance score for the selected web page to the stationary distribution of the selected web page divided by the value calculated in block 305. The component then loops to block 303 to select the next web page.

Figure 4:
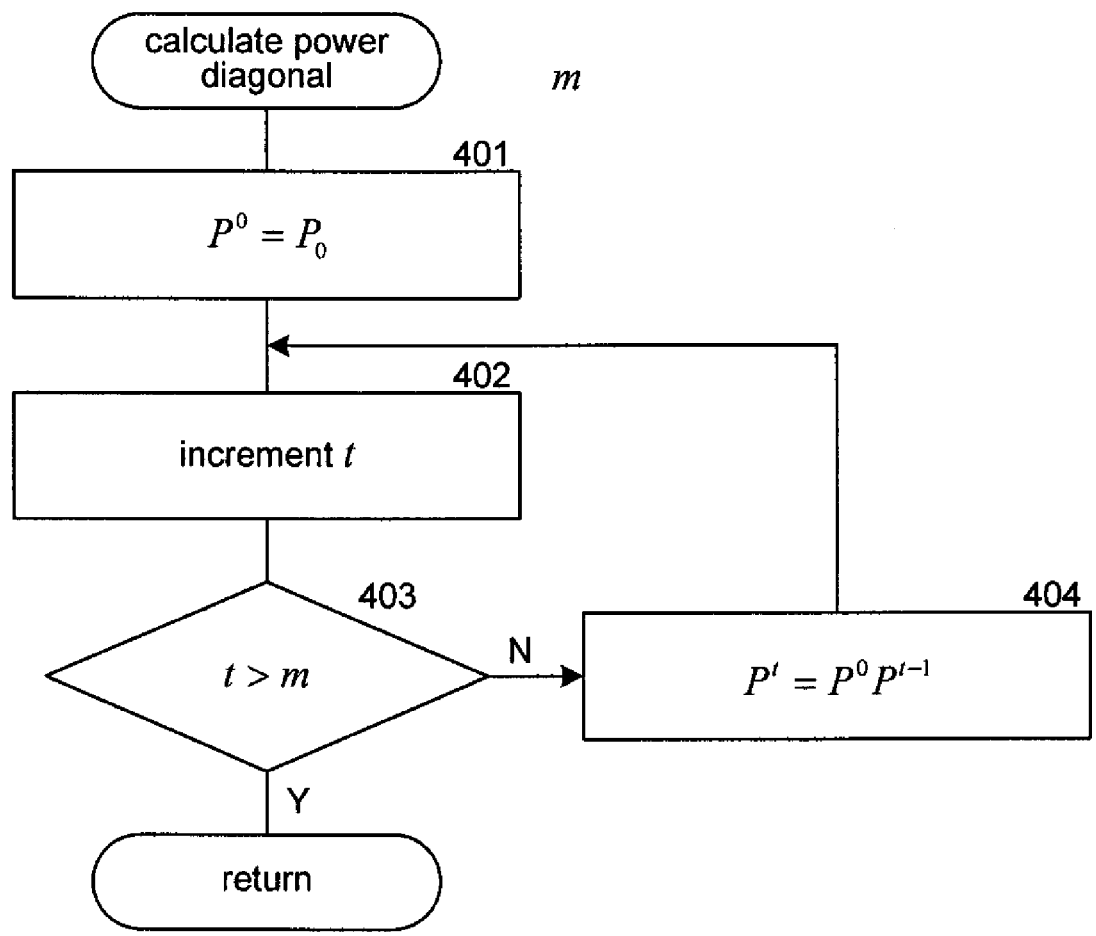
FIG. 4 is a flow diagram that illustrates the processing of the calculate power diagonals component of the calculate importance system in one embodiment.

FIG. 4 is a flow diagram that illustrates the processing of the calculate power diagonals component of the calculate importance system in one embodiment. The component calculates the diagonal values for the powers of the transition probability matrix by calculating the powers of the transition probability matrices—a brute-force approach. The component is passed an indication of the number of transitions. In block 401, the component initializes the zero power of the transition probability matrix to the initial transition probability matrix. In block 402, the component increments an indication of the current power. In decision block 403, if the current power is greater than the number of transitions, then the component returns, else the component continues at block 404. In block 404, the component calculates the next power of the transition probability matrix and then loops to block 402 to select the next power. Alternatively, the calculate importance system may use a random sampling approach to compute the diagonals of the power transition probability matrix as described in Kamvar, S., Haveliwala, T., Manning, C., and Golub, G., "Exploiting the Block Structure of the Web for Computing PageRank," Stanford University Technical Report, 2003.

Figure 5:
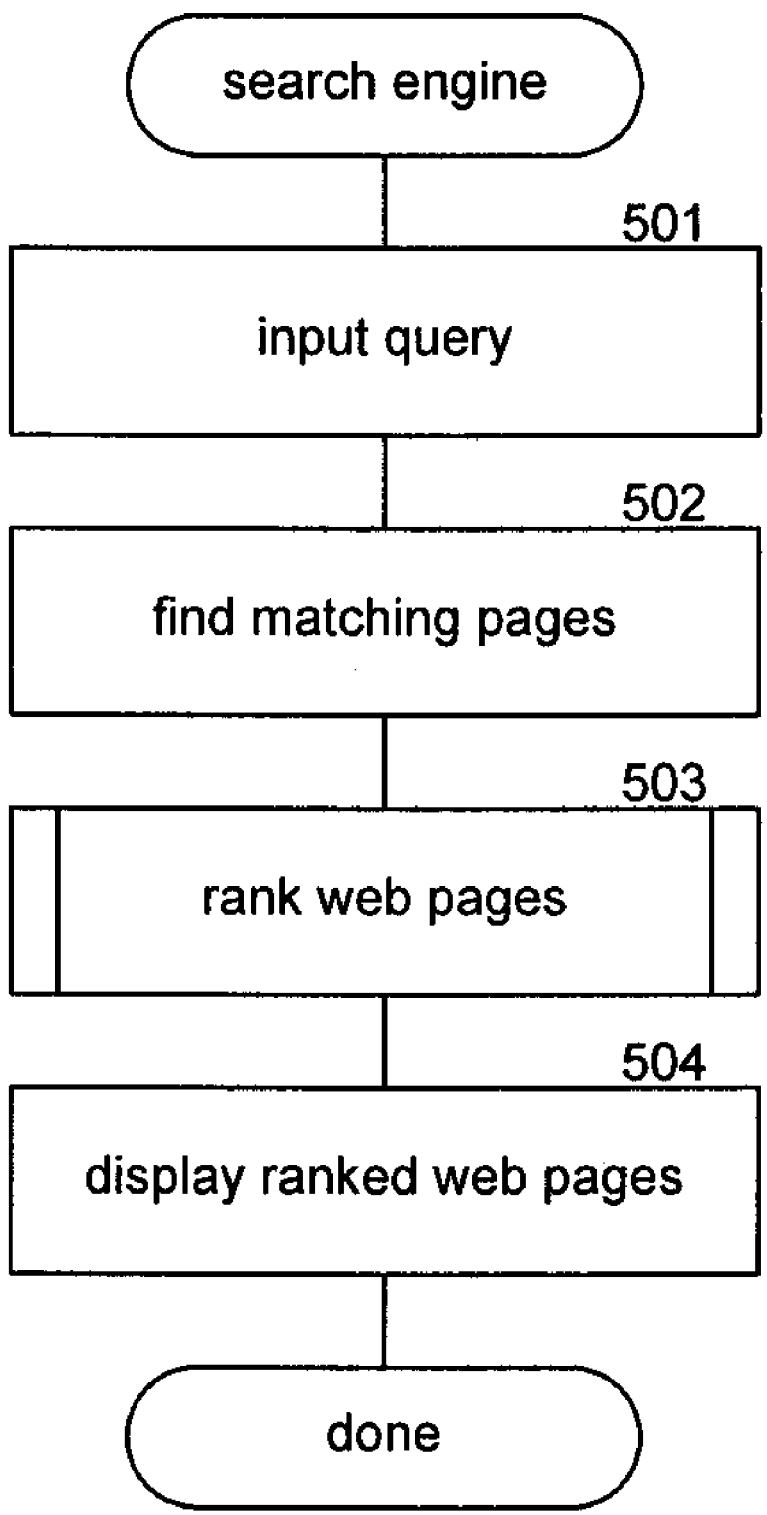
FIG. 5 is a flow diagram that illustrates the processing of the search engine component of the calculate importance system in one embodiment.

FIG. 5 is a flow diagram that illustrates the processing of the search engine component of the calculate importance system in one embodiment. In block 501, the component inputs a query from a user. In block 502, the component finds web pages that match the query using the keyword/web page index. In block 503, the component invokes the rank web pages component to rank the matching web pages. In block 504, the component displays the web pages in ranked order. The component then completes.

Figure 6:
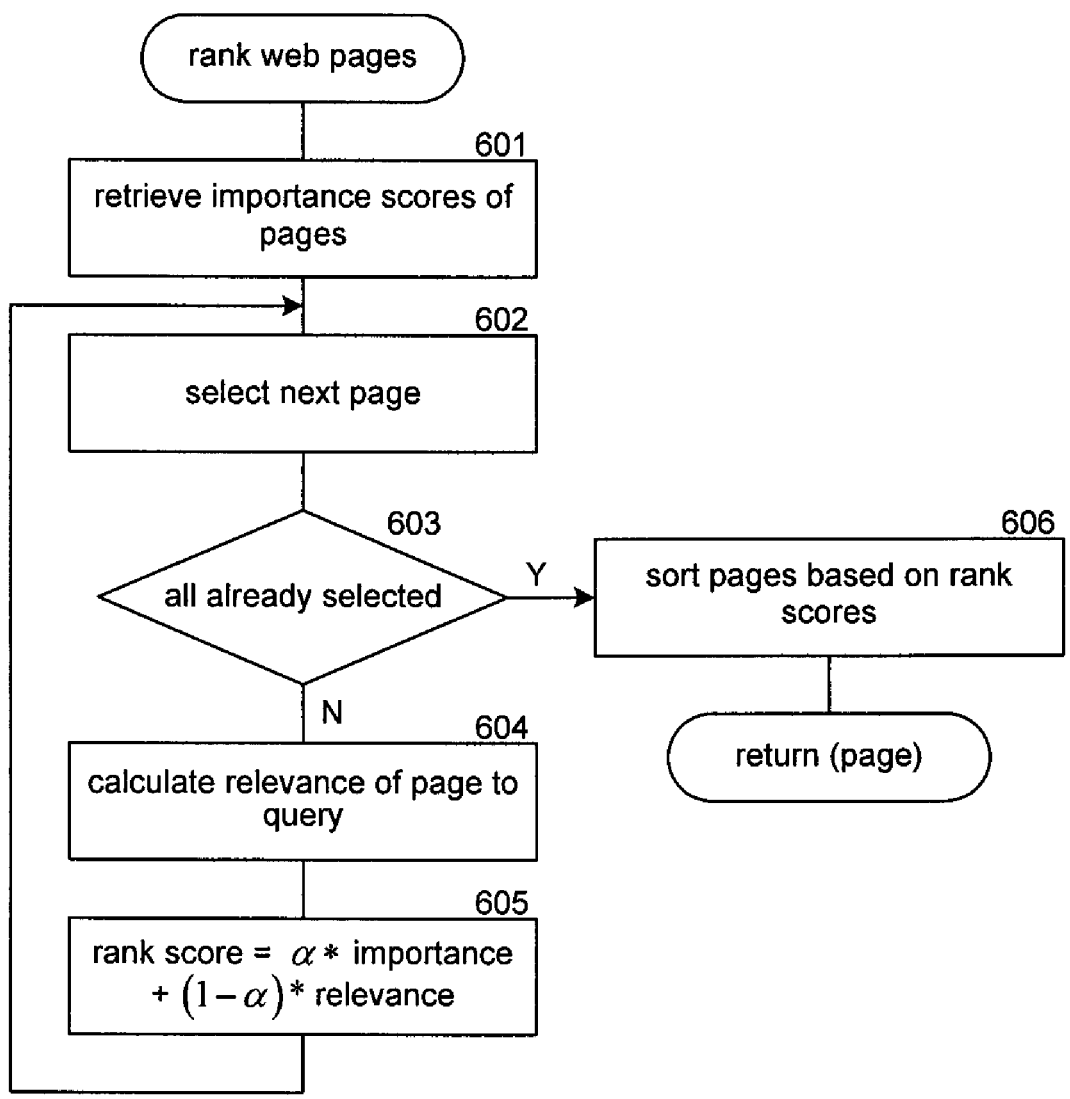
FIG. 6 is a flow diagram that illustrates the processing of the rank web pages component of the calculate importance system in one embodiment.

FIG. 6 is a flow diagram that illustrates the processing of the rank web pages component of the calculate importance system in one embodiment. The component is passed web pages and ranks the web pages based on relevance and global importance. In block 601, the component retrieves the importance scores of the web pages. In block 602, the component selects the next web page. In decision block 603, if all the web pages have already been selected, then the component continues at block 606, else the component continues at block 604. In block 604, the component calculates the relevance of the web page to the query. In block 605, the component generates a rank score for the selected web page by combining the global importance of the web page with the relevance of the web page. The component then loops to block 602 to select next web page. In block 606, the component sorts the web pages based on the rank scores and returns the ranked web pages.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that a document can include any information content that contains links or otherwise identifies other content. For example, a document may be a web page with links to other web pages, a scholarly article with citations to other scholarly articles, a judicial opinion with citations to other judicial opinions, a patent with citations to other patents, and so on. Accordingly, the invention is not limited except as by the appended claims.

We claim:

1. A method in a computing device for generating an importance score for documents having links between the documents, the method comprising:

initializing an initial probability distribution for each document; and for each document, calculating by the computing device a diagonal element of a fundamental matrix based on the initial probability distribution and a probability transition matrix, the fundamental matrix representing for each combination of two documents a summation of a difference between a probability for that combination of documents after a number of transitions based on the probability transition matrix and between the probability of the initial probability distribution for a document of the combination; and setting by the computing device the importance score of the document based on the calculated diagonal element for the document and the initial probability distribution wherein an element of the fundamental matrix is represented by the following:

$$Z_{ij} = \delta_{ij} + \sum_{t=1}^{\infty}(P_{ij}^t - \pi_j)$$

where $Z_{ij}$ represents the element for documents i and j, $\delta_{ij}$ is 1 for documents i and j where i is equal to j and 0 otherwise, $P_{ij}^t$, represents the entry of the probability transition matrix after t transitions for documents i and j, and $\pi_j$ represents the initial probability distribution for document j.

2. A method in a computing device for generating an importance score for documents having links between the documents, the method comprising:

initializing an initial probability distribution for each document; and for each document, calculating by the computing device a diagonal element of a fundamental matrix based on the initial probability distribution and a probability transition matrix, the fundamental matrix representing for each combination of two documents a summation of a difference between a probability for that combination of documents after a number of transitions based on the probability transition matrix and between the probability of the initial probability distribution for a document of the combination; and setting by the computing device the importance score of the document based on the calculated diagonal element for the document and the initial probability distribution wherein an element of the fundamental matrix is approximated by the following:

$$\hat{Z}_{ij} = \delta_{ij} + \sum_{t=1}^{m}(P_{ij}^t - \pi_j)$$

where $\hat{Z}_{ij}$ represents an approximation of the element for documents i and j, $\delta_{ij}$ is 1 for documents i and j where i is equal to j and 0 otherwise, $P_{ij}^t$ represents the entry of the probability transition matrix after t transitions for documents i and j, $\pi_j$ represents the initial probability distribution for document j, and m represents the number of transitions.

3. The method of claim 2 including calculating the diagonal elements of the probability distribution matrix after m transitions.

4. The method of claim 3 wherein the diagonal elements are calculated using a random sampling technique.

5. The method of claim 2 wherein the documents are web pages and the web pages are ranked at least in part based on the importance scores.

6. The method of claim 5 wherein the web pages are search results of a search request and the web pages are ranked at least in part based on relevance of the web pages to the search request.

7. The method of claim 2 wherein the initial probability distribution is based on a stationary distribution of the transition probability matrix.

8. The method of claim 2 wherein the initial probability distribution is uniform.

9. The method of claim 2 wherein the initial probability distribution is zero for documents considered to be spam.

10. The method of claim 2 wherein the initial probability distribution is personalized to a user.

11. A computer-readable storage medium encoded with instructions for controlling a computing device to calculate importance of web pages, by a method comprising:

calculating a mean hitting time for each web page, the mean hitting time for a target web page being based on number of transitions from a starting web page to land on the target web page and based on an initial probability distribution of starting web pages, the starting web pages including a web page other than the target web page, by, for each web page:

calculating a diagonal element of a fundamental matrix based on an initial probability distribution and a probability transition matrix, the fundamental matrix representing for each combination of two web pages a summation of a difference between a probability for that combination of web pages after a number of transitions based on the probability transition matrix and between the probability of the initial probability distribution for a web page of the combination; and setting by the computing device the importance score of the web page based on the calculated diagonal element for the document and the initial probability distribution;

receiving a query;

identifying web pages that match the query;

ranking the identified web pages based on their importance scores; and displaying an indication of the identified web pages along with an indication of the ranking of the identified web pages wherein an element of the fundamental matrix is represented by the following:

$$Z_{ij} = \delta_{ij} + \sum_{t=1}^{\infty}(P_{ij}^t - \pi_j)$$

where $Z_{ij}$ represents the element for web pages i and j, $\delta_{ij}$ is 1 for web pages i and j where i is equal to j and 0 otherwise, $P_{ij}^t$ represents the entry of the probability transition matrix after t transitions for documents i and j, and $\pi_j$ represents the initial probability distribution for web page j.

12. A computer-readable storage medium encoded with instructions for controlling a computing device to calculate importance of web pages, by a method comprising:

calculating a mean hitting time for each web page, the mean hitting time for a target web page being based on number of transitions from a starting web page to land on the target web page and based on an initial probability distribution of starting web pages, the starting web pages including a web page other than the target web page, by, for each web page:

calculating a diagonal element of a fundamental matrix based on an initial probability distribution and a probability transition matrix, the fundamental matrix representing for each combination of two web pages a summation of a difference between a probability for that combination of web pages after a number of transitions based on the probability transition matrix and between the probability of the initial probability distribution for a web page of the combination; and setting by the computing device the importance score of the web page based on the calculated diagonal element for the document and the initial probability distribution;

receiving a query;

identifying web pages that match the query;

ranking the identified web pages based on their importance scores; and displaying an indication of the identified web pages along with an indication of the ranking of the identified web pages wherein an element of the fundamental matrix is approximated by the following:

$$\hat{Z}_{ij} = \delta_{ij} + \sum_{t=1}^{m} (P_{ij}^t - \pi_j)$$

where $\hat{Z}_{ij}$ represents an approximation of the element for web pages i and j, $\delta_{ij}$ is 1 for web pages i and j where i is equal to j and 0 otherwise, $P_{ij}^t$ represents the entry of the probability transition matrix after t transitions for documents i and j, $\pi_j$ represents the initial probability distribution for web pages j, and m represents the number of transitions.

13. The computer-readable storage medium of claim 12 wherein the initial probability distribution of the starting web pages is based on mean returning time.

14. The computer-readable storage medium of claim 12 wherein the initial probability distribution of starting web pages is user-specific.

15. The computer-readable storage medium of claim 12 wherein the initial probability distribution of starting web pages is based on a stationary probability of transition probabilities of the web pages.

* * * * *